(12) United States Patent
Du (10) Patent No.: US 10,298,835 B2
(45) Date of Patent: May 21, 2019

(54) IMAGE CONTROL METHODS AND APPARATUSES, AND IMAGING DEVICES WITH CONTROL OF DEFORMATION OF IMAGE SENSOR

(71) Applicant: BEIJING ZHIGU RUI TUO TECH CO., LTD., Beijing (CN)

(72) Inventor: Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/559,204

(22) PCT Filed: Mar. 4, 2016

(86) PCT No.: PCT/CN2016/075563
§ 371 (c)(1),
(2) Date: Sep. 18, 2017

(87) PCT Pub. No.: WO2016/150291
PCT Pub. Date: Sep. 29, 2016

(65) Prior Publication Data
US 2018/0070004 A1    Mar. 8, 2018

(30) Foreign Application Priority Data

Mar. 24, 2015  (CN) .......................... 2015 1 0130606

(51) Int. Cl.
| H04N 5/232 | (2006.01) |
| H04N 5/369 | (2011.01) |
| G06T 7/50  | (2017.01) |

(52) U.S. Cl.
CPC ....... *H04N 5/23212* (2013.01); *H04N 5/3696* (2013.01); *G06T 7/50* (2017.01)

(58) Field of Classification Search
CPC .............................. H04N 5/23212; G06T 7/50
See application file for complete search history.

(56) References Cited

U.S. PATENT DOCUMENTS

| 8,416,338 B2 | 4/2013 | Nagasaka et al. |
| 2008/0151089 A1 | 6/2008 | Street et al. |

(Continued)

FOREIGN PATENT DOCUMENTS

| CN | 101742107 A | 6/2010 |
| CN | 103353667 A | 10/2013 |

(Continued)

OTHER PUBLICATIONS

International Search Report and Written Opinion for Application No. PCT/CN2016/075563, dated May 25, 2016, 7 pages.

(Continued)

*Primary Examiner* — Padma Haliyur
(74) *Attorney, Agent, or Firm* — Sheppard Mullin Richter & Hampton LLP (57) ABSTRACT

The present application discloses various imaging control methods and apparatuses, and various imaging devices. One of the imaging control methods includes: determining, at least according to depth information of an object to be photographed, target in focus depth positions respectively corresponding to at least two imaging sub-areas of the image sensor; controlling deformation of the image sensor so as to make depth positions of reference points of the at least two imaging sub-areas after the deformation approach or coincide with the corresponding target in focus depth positions; and acquiring, based on the image sensor after the deformation, an image of the object. Technical solutions provided by the present application may improve quality of imaging.

18 Claims, 6 Drawing Sheets

(56) References Cited

U.S. PATENT DOCUMENTS

2014/0139636 A1* 5/2014 Park ............... H04N 5/3696
                                                       348/46
2016/0161769 A1  6/2016 Du et al.
2018/0276834 A1  9/2018 Du et al.

FOREIGN PATENT DOCUMENTS

| CN | 103824303 A  | 5/2014 |
| CN | 104410784 A  | 3/2015 |
| JP | 2005-058399 A | 3/2005 |

OTHER PUBLICATIONS

Bar-Cohen et al., "Electroactive Polymers for Refreshable Braille Displays," SPIE, Sep. 2009, 3 pages.
Ko et al., "A Hemispherical Electronic Eye Camera Based on Compressible Silicon Optoelectronics," Nature, Aug. 2008, vol. 454, p. 748-753.
Ng et al., "Flexible Image Sensor Array with Bulk Heterojunction Organic Photodiode," Applied Physics Letters, 2008, vol. 92, p. 213303.
Yu et al., "Directed Bending of a Polymer Film by Light," Nature, Sep. 2003, vol. 425, p. 145.

\* cited by examiner

IMAGE CONTROL METHODS AND APPARATUSES, AND IMAGING DEVICES WITH CONTROL OF DEFORMATION OF IMAGE SENSOR

CROSS-REFERENCE TO RELATED APPLICATIONS

This application is a National Phase Application of International Application No. PCT/CN2016/075563, filed on Mar. 4, 2016, which claims the benefit of priority to Chinese Patent Application No. 201510130606.1, filed on Mar. 24, 2015, and entitled "Imaging Control Methods and Apparatuses, and Imaging Devices". Both of the above-referenced applications are incorporated into the present application by reference herein in their entirety.

TECHNICAL FIELD

The present application relates to the field of terminal technologies, and in particular, to various imaging control methods and apparatuses, and various imaging devices.

BACKGROUND

The depth of field (DoF) and aperture are important imaging control parameters. The depth of field usually means a depth scope in which clear imaging of an object can be acquired by a camera lens. Usually the imaging in the depth of field is clear, while the imaging out of the depth of field is relative blurred. The aperture size may affect the quantity of light through a lens aperture in unit time. By adjusting the aperture, the imaging parameters, such as the exposure time and depth of field, may be adjusted. For example, the degree of exposure may be increased by increasing the aperture, so that a higher shutter speed may be acquired, but the depth of field is relative shallow.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

Embodiments of the present application provide various imaging control methods and apparatuses, and various imaging devices.

According to a first aspect, an embodiment of the present application provides an imaging control method, including:
determining, according to depth information of an object, target in focus depth positions respectively corresponding to at least two imaging sub-areas of an image sensor;
controlling deformation of the image sensor so as to make depth positions of reference points of the at least two imaging sub-areas after the deformation approach or coincide with the corresponding target in focus depth positions; and
acquiring, based on the image sensor after the deformation, an image of the object.

According to a second aspect, an embodiment of the present application further provides an imaging control apparatus, including:
a target in focus depth determining module, configured to determine, at least according to depth information of an object, target in focus depth positions respectively corresponding to at least two imaging sub-areas of an image sensor;
a deformation control module, configured to control deformation of the image sensor so as to make depth positions of reference points of the at least two imaging sub-areas after the deformation approach or coincide with the target in focus depth positions; and
an imaging module, configured to acquire, based on the image sensor after the deformation, an image of an object.

According to a third aspect, an embodiment of the present application further provides an imaging device, including:
an imaging optical system, a deformable image sensor and any imaging control apparatus provided by embodiments of the present application.

Technical solutions provided by the embodiments of the present application may determine, at least according to the depth information of the object, the target in focus depth positions respectively corresponding to the at least two imaging sub-areas of the image sensor; utilize the deformable property of the image sensor to control the deformation of the image sensor so as to make the depth positions of the reference points of the at least two imaging sub-areas approach or coincide with the target in focus depth positions; and acquire, based on the image sensor after the deformation, the image of the object. In this way, for the different imaging sub-areas, clear imaging can be acquired in a certain depth of field scope by taking the corresponding target in focus depth positions as the reference points, thereby expanding a scope for clear imaging of the whole imaging device, and improving quality of imaging.

These and other advantages of the present application are more obvious with reference to optional embodiments of the present application described below in detail in combination with the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Persons skilled in the art should understand that components in the accompanying drawings are shown merely for simpleness clearness, and are not always drawn to scale. For example, sizes of some components may be amplified relative to other components, so as to facilitate enhancing the understanding of embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

It should be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementation manners of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any logical relationship between the terms.

Figure 1A:
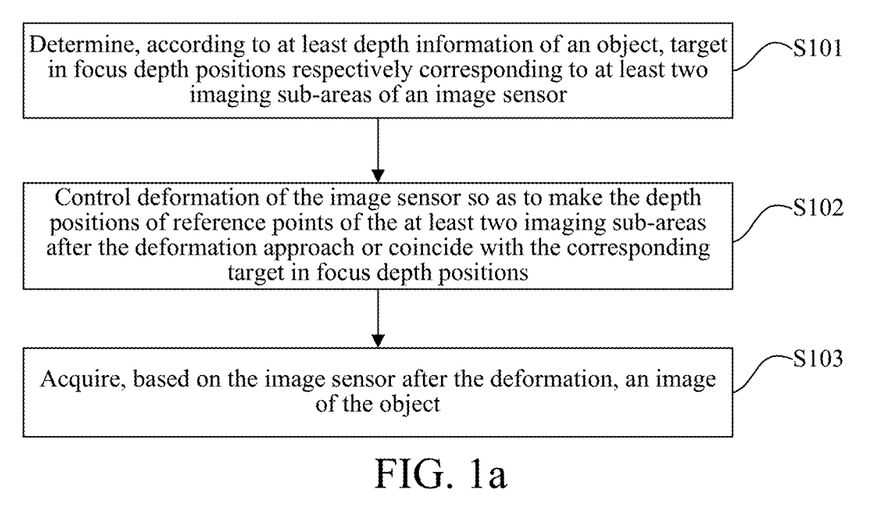
FIG. 1a is a flowchart of an imaging control method provided by an embodiment of the present application.

FIG. 1a is a flowchart of an imaging control method provided by an embodiment of the present application. The imaging control method provided by the embodiment of the present application may be executed by an imaging control apparatus. The type of the imaging control apparatus is not limited, for example, the imaging control apparatus may be an independent part; or, the imaging control apparatus may be integrated in an imaging device as a functional module. The imaging device may include, but is not limited to, a camera, a video camera, a mobile phone, a tablet, and an electronic device having a function of photographing or video shooting, which is not limited in the embodiment of the present application. As shown in FIG. 1a, an imaging control method provided by the embodiment of the present application includes:

S101: Determine, according to at least depth information of an object, target in focus depth positions respectively corresponding to at least two imaging sub-areas of an image sensor.

According to the classical optics theory, to acquire clear imaging of an object, usually the following formula needs to be satisfied:

$$\frac{1}{f} = \frac{1}{u} + \frac{1}{v} \quad (1)$$

where f represents a focal distance of a lens, u represents an object distance, and v represents an image distance.

An imaging device usually has an ideal in focus position in order to acquire clear imaging of an object, and the ideal in focus position may be referred to as a target in focus depth position. In response to an application scenario in which the imaging device such as a camera is used to implement imaging control of the object, after the imaging device adopts a manual focus or an auto focus manner to accomplish focusing, an imaging plane of the image sensor is usually considered to be located at the target in focus depth position. At this moment, the focal distance of the camera lens is f in the foregoing formula, a distance between the imaging plane of the image sensor in the imaging device and the camera lens is the image distance v in the foregoing formula, and the distance between the object and the camera lens is the object distance u in the foregoing formula. If depth information of different parts of the object is not the same, the distance between the different parts of the object and the camera lens, that is, the object distance u is different. In this case, based on the depth information of the object, the target in focus depth positions respectively corresponding to the at least two imaging sub-areas of the image sensor may be obtained through calculation according to the foregoing formula. Each of the imaging sub-areas corresponds to a part of the object, and the target in focus depth position corresponding to an imaging sub-area is equal to the optimal focus depth position where clear imaging the part of the object corresponding to the imaging sub-area can be acquired, that is, the target in focus depth position.

S102: Control deformation of the image sensor so as to make the depth positions of reference points of the at least two imaging sub-areas after the deformation approach or coincide with the corresponding target in focus depth positions.

A surface shape of the image sensor described in the embodiment of the present application is deformable, for example, at least a part of the surface shape of the imaging plane of the image sensor may change, and the specific structure and form of components of the image sensor are not limited.

Figure 1B:
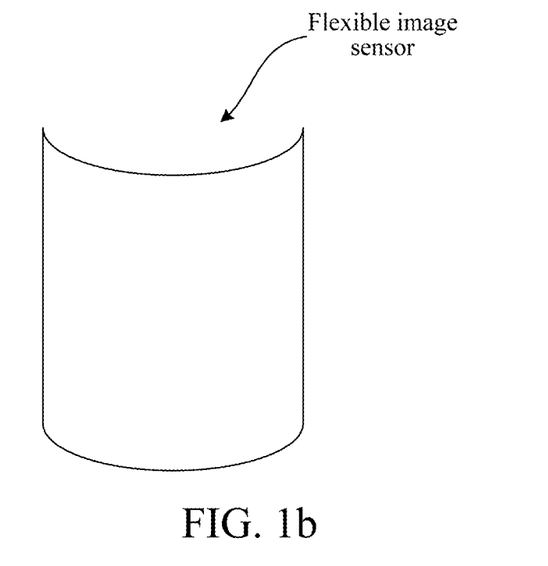
FIG. 1b shows an example of a flexible image sensor provided by an embodiment of the present application.

For example, the image sensor may be a flexible image sensor, which has already been applied in some imaging devices. The flexible image sensor may be curved to a certain degree by an external force in the present application, as shown in FIG. 1b, which changes projections of the reference points of the at least two imaging sub-areas of the flexible image sensor in a depth direction, so that the reference points of the at least two imaging sub-areas have position changes in the depth direction separately.

Figure 1C:
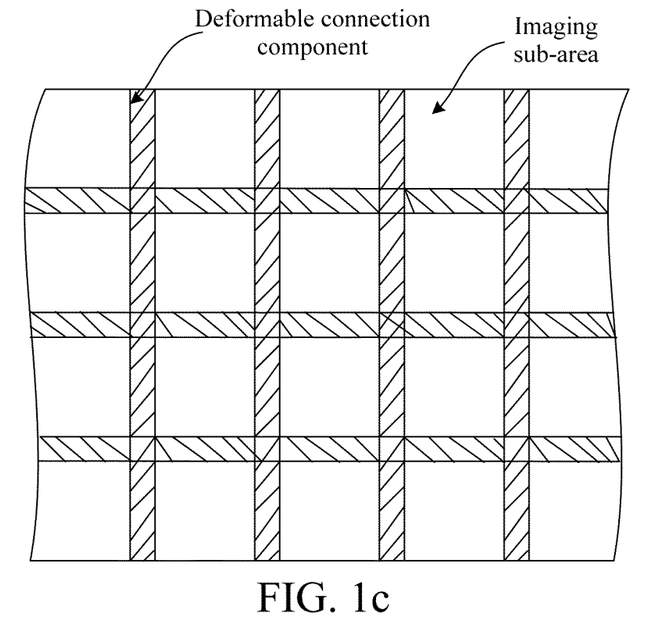
FIG. 1c shows an example of an image sensor having multiple imaging sub-areas in an array distribution provided by an embodiment of the present application.

For example, as shown in FIG. 1c, the image sensor may include multiple imaging sub-areas in an array distribution. The at least two imaging sub-areas are connected by a deformable connection component, such as an elastic component or a controlled deformable material component (for example, a photo deformable material component, a magnetic deformable material component, a piezoelectric material component, and the like), to form the whole imaging plane. By controlling the deformation of the deformable connection component, the reference points of the at least two imaging sub-areas may be controlled to have position changes in the depth direction separately. For example, the external force or an external field is applied on the connection component in the present application, so that the corresponding imaging sub-areas are driven to move along the depth direction, that is, move relative to a reference position of the whole original imaging plane of the image sensor along the depth direction to protrude or concave from the imaging plane. In this way, the reference points of the at least two imaging sub-areas have position changes in the depth direction separately.

It may be understood that, according to the need of an actual application, the foregoing imaging sub-areas in the array distribution and the flexible image sensor may also be used in combination to form a deformable image sensor.

Any one of the imaging sub-areas may include at least one image sensor pixel point. In an actual application, according to the need of the actual application, any point in an imaging sub-area may be taken as a reference point of this imaging sub-area. For example, a central point of the imaging sub-area or one point between the center and an edge is taken as the reference point, to facilitate comparison between the depth positions of different imaging sub-areas and the corresponding target in focus depth positions in the depth direction.

By utilizing the deformable property of the image sensor, the surface shape of the image sensor may be changed so as to make the depth positions of the reference points of the at least two imaging sub-areas of the image sensor after the deformation approach or coincide with the corresponding target in focus depth positions. For example, the imaging sub-areas A1, A2, A3 . . . respectively correspond to the target in focus depth positions a1, a2, a3 . . . . The deformation of the image sensor is controlled so as to make the depth position of the reference point of the imaging sub-area A1 approach or coincide with the target in focus depth position a1 as much as possible, the depth position of the imaging sub-area A2 approach or coincide with the target in focus depth position a2 as much as possible, and the depth position of the imaging sub-area A3 approach or coincide with the target in focus depth position a3 as much as possible . . . , which is equivalent to that the image sensor is located at the in focus position through a manual focus or an auto focus. Fine focus is then performed on the at least two imaging sub-areas of the image senor so as to make the actual depth positions of the at least two imaging sub-areas approach or coincide with the corresponding target in focus depth positions.

Persons of ordinary skill in the art may understand that "approach or coincide with the corresponding target in focus depth positions" represents a variation trend or an objective expectation of the depth positions of the corresponding sub-areas, and the meaning thereof should be understood in a broad sense.

For example, "approach" reflects a variation trend or objective expectation. For the same imaging sub-area A1, before and after the deformation of the image sensor, the depth positions of this imaging sub-area are respectively a1' and a1". The target in focus depth position corresponding to the imaging sub-area A1 is a1, and the distance between a1" and a1 in the depth direction is shorter than the distance between a1' and a1 in the depth direction. That is, through the deformation of the image sensor, the depth position a1" of the imaging sub-area A1 after the deformation may be closer to or even coincide with the target in focus depth position a1. The distance between the depth position a1" of the imaging sub-area A1 after the deformation and the target in focus depth position a1 may be determined according to the actual need, which is not limited by the present application. It can be seen that "approach" described in the embodiment of the application includes situations of approaching the target in focus depth position as much as possible considering factors, such as limit of adjustment (in some situations of the actual adjustment, coincidence is an ideal state, and the depth position can approach the target in focus depth position as much as possible but cannot coincide with it), and also includes the situation of being closer to the target in focus depth position compared with the depth position before the deformation.

For example, "coincide with" reflects a variation trend or objective expectation. In the actual application, limited by factors such as accuracy of adjustment and constraint of deformation performance of the image sensor, sometimes the target in focus depth position probably cannot be achieved accurately in the actual focus adjustment process. Therefore, in the actual adjustment process, the position may be approached as much as possible. If a focus error after the adjustment is in an allowable scope, it may be considered that the depth position after the adjustment coincides with the target in focus depth position, that is, the coincidence includes the situation of accurate coincidence, and also includes the situation of an approximate coincidence in the range of allowable errors.

S103: Acquire, based on the image sensor after the deformation, an image of the object.

During a process of implementing the embodiment of the present application, the inventor finds that, after the manual focus or automatic focus is completed by using the imaging plane of the image sensor as a focus adjustment granularity, the imaging plane of the image sensor is located at a relatively ideal focus position. If at this moment, the image sensor directly acquires the image of the object, clear imaging can be acquired for a part to be photographed in a depth scope in front of or behind the relative ideal focus position (that is, the depth of field scope), while the imaging of the part to be photographed out of the depth of field scope is usually blurred. In some situations, for example, in a situation in which a depth distribution of the part of the object that is expected to have the clear imaging exceeds the depth of field scope, and/or in a situation of photographing with the shallow depth of field, such as large aperture photographing, the image acquired directly by the imaging device whose focusing is completed by using the imaging plane of the image senor as the focus adjustment granularity is used, and the quality of the image needs to be improved. For example, a user expects to have the clear imaging of different parts of a human head; however, because the depth distribution of the human head is relatively broad (exceeding the allowable depth of field scope), or because large aperture photographing with the shallow depth of field is used, the image acquired by the imaging device after adopting the conventional focusing may have the problem in which some parts are clear and some parts are blurred. For example, the nose of a human body that is close to the lens is clear, and the ears that are far from the lens are blurred. Therefore, the quality of imaging is not satisfying.

The technical solution provided by the present application is adopted to perform the fine focus on the image sensor after focusing including but not limited to the manual focus or auto focus is completed, thereby expanding the scope of the clear imaging of the object, and improving the quality of imaging. Specifically, at least according to depth information of the object, the target in focus depth positions respectively corresponding to the at least two imaging sub-areas of the image sensor may be determined; and the deformable property of the image sensor is utilized to control the deformation of the image sensor so as to make the depth positions of the reference points of the at least two imaging sub-areas after the deformation approach or coincide with the corresponding target in focus depth positions. Based on the image sensor after the deformation, the image of the object is acquired. In this way, clear imaging can be acquired in a certain depth of field scope by taking the corresponding target in focus depth positions as the reference points, thereby expanding a scope for clear imaging of the whole imaging device, and improving quality of imaging. Particularly, in a scenario in which the actual depth distribution of the part to be photographed does not match the depth of field scope of the imaging device, and/or in a scenario of large-aperture photographing, the technical solution provided by the embodiment of the present application is adopted to expand the maximum depth of field scope as much as possible in the actual imaging through fine matching of the respective target in focus depth positions of the imaging sub-areas, so as to improve the matching of the depth of field scope of the imaging device and the actual depth distribution of the part to be photographed, and/or expand the depth of field scope in large-aperture photographing, thereby expanding the scope of clear imaging of the whole imaging device, and improving the quality of imaging.

Figure 2:
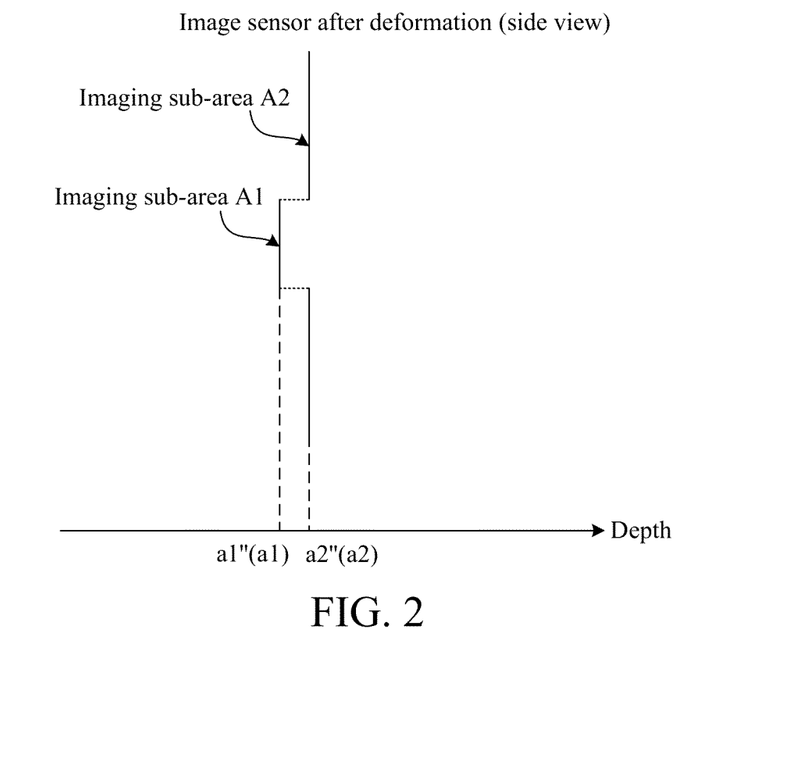
FIG. 2 shows an example of utilizing deformation of an image sensor provided by an embodiment of the present application.

Optionally, the at least two target in focus depth positions respectively corresponding to the at least two imaging sub-areas are different. For example, as shown in FIG. 2b, in the target in focus depth positions a1 and a2 respectively corresponding to the imaging sub-areas A1 and A2, the positions a1 and a2 are different. The solution may take the imaging sub-area as the focusing granularity, and perform the fine focus on the at least two imaging sub-areas so as to make the focus positions respectively corresponding to the at least two imaging sub-areas approach or even coincide with the target in focus depth positions as much as possible after the deformation of the image sensor. For example, the depth position a1" of the reference point of the imaging sub-area A1 approaches or coincide with the target in focus depth position a1 as much as possible, and the depth position a2" of the reference point of the imaging sub-area A2 approaches or coincide with the target in focus depth position a2 as much as possible, but the target in focus depth position a1 and the target in focus depth position a2 are different. Therefore, the target in focus depth position a1 and the target in focus depth position a2 are taken as a reference, and each is corresponding to a depth of field scope in which the clear imaging can be acquired, so as to make the part to be photographed in the depth of field scopes have the clear imaging, and improve the quality of imaging.

A deformation control manner of the image sensor is to control the deformation of the image sensor according to an actual need, and is very flexible. For example, the deformation constraint information of the image sensor may be determined; and the deformation of the image sensor may be controlled according to the deformation constraint information and the target in focus depth positions. The solution combines the deformation constraint information of the image sensor with the target in focus depth position information, which are commonly used as a basis for the deformation control of the image sensor, so that within the allowable scope of the deformation of the image sensor, the actual focus positions of the at least two imaging sub-areas approach or coincide with the corresponding target in focus depth positions as much as possible, thereby improving practicability of the solution and rationality of the deformation control. The deformation constraint information of the image sensor may include but is not limited to: allowable deformation of a single imaging sub-area, maximum deformation of the whole image sensor, and the like. Further, a maximum deformation depth scope along the depth direction of the at least two imaging sub-areas may be determined according to the deformation constraint information; the deformation of the at least two imaging sub-areas may be controlled according to the maximum deformation depth scope and the target in focus depth positions. The solution allocates, through determining the maximum deformation depth scope, the allowable deformation of the maximum deformation depth scope to the at least two imaging sub-areas, and a specific allocation manner may be determined according to the actual need. For example, in a continuous imaging area corresponding to the at least two imaging sub-areas, the deformation of the imaging sub-area in a central part of the imaging area is the greatest in the maximum deformation depth scope, while the deformation of the imaging sub-area in other parts of the imaging area is relative small. The solution may allocate the deformation in an aimed manner within the maximum deformation depth scope and/or improve a utilization of the deformation, thereby widening the application scope of the solution.

Figure 3:
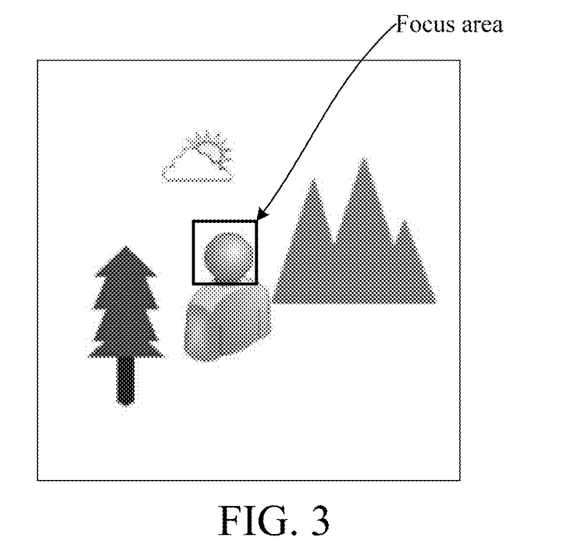
FIG. 3 shows an example of a focus area provided by an embodiment of the present application.

Optionally, the imaging control method provided by the embodiment of the application further includes: determining, according to a preview image of the object, the focus area; and determining, according to the focus area, the at least two imaging sub-areas, where the at least two imaging sub-areas respectively correspond to at least two focus sub-areas included in the focus area. The focus area usually corresponds to an area where clear imaging is desired, and the whole or a part of the preview image may be determined as the focus area according to the preview image of the object. For example, the focus area may be determined according to information selected by a user in the preview image, or the focus area may be determined according to an image analysis result of the preview image. For example, it is determined that a recognized human head area is determined as the focus area (as shown in FIG. 3), and the implementation manner is flexible. After the focus area is determined, the imaging area corresponding to the focus area may be determined in the imaging plane of the image sensor according to the focus area, that is, the at least two imaging sub-areas, where each of the imaging sub-areas corresponds to a focus sub-area in the focus area. For example, the at least two imaging sub-areas are determined according to the focus area, the depths of the different parts of the object corresponding to the at least two focus sub-areas of the focus area are taken as object distances, and according to formula (1), the target in focus depth positions of the at least two imaging sub-areas respectively corresponding to the at least two focus sub-areas are determined. By controlling the deformation of the image sensor, the actual focus positions of the at least two imaging sub-areas in the image sensor after the deformation approach or coincide with the respective target in focus depth positions. The solution further divides the focus area into the at least two focus sub-areas, utilizes the deformation property of the image sensor, and adjusts the focus positions of the at least two imaging sub-areas respectively corresponding to the at least two focus sub-areas to make them approach or coincide with the corresponding target in focus depth positions, thereby implementing the fine focus of the different parts of the focus area, and helping to acquire the clear image of the whole or larger scope of the focus area, especially when the depth distribution of the part to be photographed corresponding to the focus area is relatively broad, and/or in the scenario of large-aperture photographing. The solution helps to acquire the clear image of the whole or larger scope of the focus area, for example, the clear imaging of the different parts of the human head in the depth direction from the nose to the ears may all be acquired, thereby improving the quality of imaging.

Figure 4:
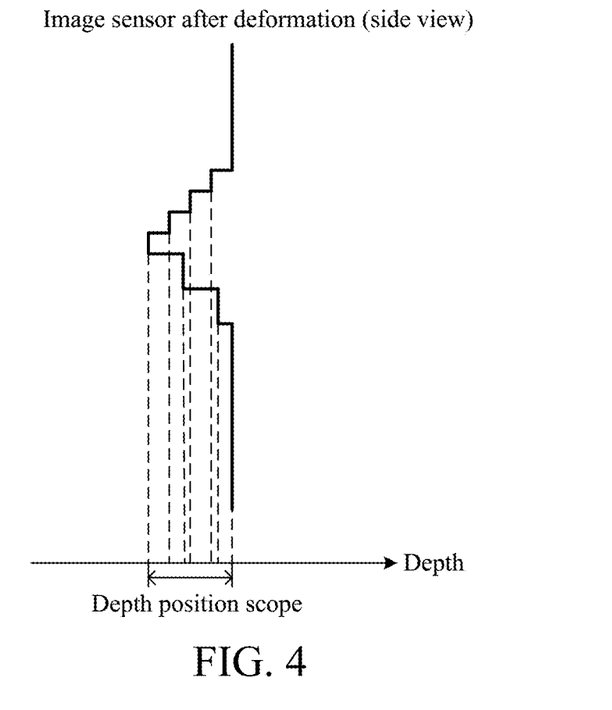
FIG. 4 shows an example of utilizing deformation of another image sensor provided by an embodiment of the present application.

Optionally, the determining, according to the focus area, the at least two imaging sub-areas, includes: determining, according to the depth information, a depth distribution scope of the focus area part corresponding to the object; and determining, according to the depth distribution scope, a quantity of the imaging sub-areas. After the focusing of each imaging sub-area is completed, a certain depth scope in front of or behind a focusing point relative to the imaging sub-area is the depth of field scope, and the part to be photographed may acquire the clear imaging in the scope. The solution determines, according to the depth distribution scope of the focus area corresponding to the object, the quantity of the imaging sub-areas so as to divide the imaging sub-areas in a more aimed manner. Optionally, the quantity of the imaging sub-areas corresponding to the focus area that corresponds to a larger depth distribution scope is greater than the quantity of the imaging sub-areas corresponding to the focus area that corresponds to a smaller depth distribution scope. For example, for the broader depth distribution scope, more imaging sub-areas (as shown in FIG. 4) are determined, and for the smaller depth distribution scope, fewer imaging sub-areas (as shown in FIG. 2) are determined, so as to divide the imaging sub-areas in a more aimed manner. Specifically, for the focus area having the broader depth distribution scope, more imaging sub-areas are determined, and the depth of field scopes of the imaging sub-areas after the focusing overlap each other so as to make the depth of filed scope after the overlapping and the depth distribution scope corresponding to the focus area match each other as much as possible, or make the depth of field scope after the overlapping cover more of the depth distribution scope corresponding to the focus area as much as possible. In this way, the probability that the different depth parts corresponding to the focus area can acquire the clear imaging may be increased significantly, thereby improving the quality of imaging. However, for the focus area having a narrower depth distribution scope, fewer imaging sub-areas are determined so as to help reduce complexity of the solution as much as possible as the imaging sub-area is taken as a granularity to implement the fine focus.

Optionally, any of the imaging control methods provided by the embodiments of the present application further includes: adjusting a depth position of the image sensor so as to make the depth position of the image sensor after the adjustment locate between depth position scopes corresponding to the at least two imaging sub-areas. In the imaging process, based on a focusing point of the imaging device, the clear imaging can be acquired in a certain depth scope along the depth direction, and the depth scope in which the clear imaging can be acquired is the depth of field relative to the focusing point. The focusing point, after the imaging device completes the manual focus or automatic focus, may be located at a position in the depth of field scope, for example, located at the central position or the edge position of the depth of field scope, or the like. By adjusting the depth position of the image sensor, the solution makes the depth position of the image sensor after the adjustment locate between the depth position scopes corresponding to the at least two imaging sub-areas, so as to change reference starting points for the fine focus of the imaging sub-areas, and help to make full use of the maximum allowable deformation depth of the image sensor, and/or, balance requirements on deformation degrees of the different imaging sub-areas, thereby improving the quality of imaging.

A person skilled in the art may understand that in any one of the foregoing methods of the specific implementation manners of the present application, the value of the serial number of each step does not mean an execution sequence, and the execution sequence of each step should be determined according to the function and internal logic thereof, and should not be any limitation on the implementation procedure of the specific implementation manners of the present application.

Figure 5:
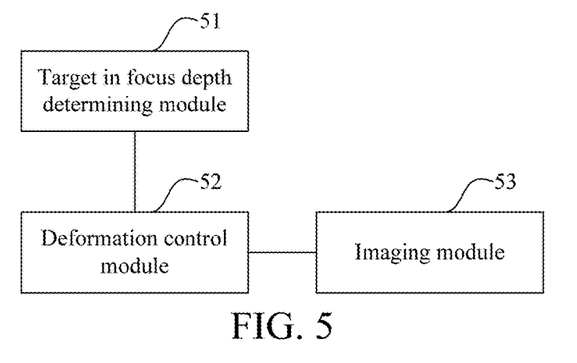
FIG. 5 is a logic block diagram of a first imaging control apparatus provided by an embodiment of the present application.

FIG. 5 is a logic block diagram of an imaging control apparatus provided by an embodiment of the present application. As shown in FIG. 5, an imaging control apparatus provided by the embodiment of the application includes: a target in focus depth determining module 51, a deformation control module 52 and an imaging module 53. The target in focus depth determining module 51 is configured to determine, at least according to depth information of an object, target in focus depth positions respectively corresponding to at least two imaging sub-areas of an image sensor. The deformation control module 52 is configured to control deformation of the image sensor so as to make depth positions of reference points of the at least two imaging sub-areas after the deformation approach or coincide with the corresponding target in focus depth positions. The imaging module 53 is configured to acquire, based on the image sensor after the deformation, an image of the object.

The imaging control apparatus provided by the embodiment of the present application may determine, at least according to the depth information of the object, the target in focus depth positions respectively corresponding to the at least two imaging sub-areas of the image sensor; utilize deformable property of the image sensor to control the deformation of the image sensor, so as to make the depth positions of reference points of the at least two imaging sub-areas after the deformation approach or coincide with the target in focus depth positions; and acquire, based on the image sensor after the deformation, an image of the object. In this way, clear imaging can be acquired in a certain depth of field scope by taking the corresponding target in focus depth positions as the reference points, thereby expanding a scope for clear imaging of the whole imaging device, and improving quality of imaging.

The type of the imaging control apparatus is not limited, for example, the imaging control apparatus may be an independent part; or, the imaging control apparatus may be integrated in an imaging device as a functional module. The imaging device may include, but is not limited to, a camera, a video camera, a mobile phone, a tablet, and an electronic device having a function of photographing or video shooting, which is not limited in the embodiment of the present application.

Optionally, the at least two target in focus depth positions are different. The solution may take the imaging sub-area as the focusing granularity, and perform the fine focus on the at least two imaging sub-areas so as to make the focus positions respectively corresponding to the at least two imaging sub-areas approach or even coincide with the respective target in focus depth positions as much as possible after the deformation of the image sensor, thereby improving the quality of imaging.

Optionally, the reference point of at least one of the imaging sub-areas is a central point of the imaging sub-area, to facilitate comparison between the depth positions of different imaging sub-areas and the corresponding target in focus depth positions in the depth direction.

Figure 6:
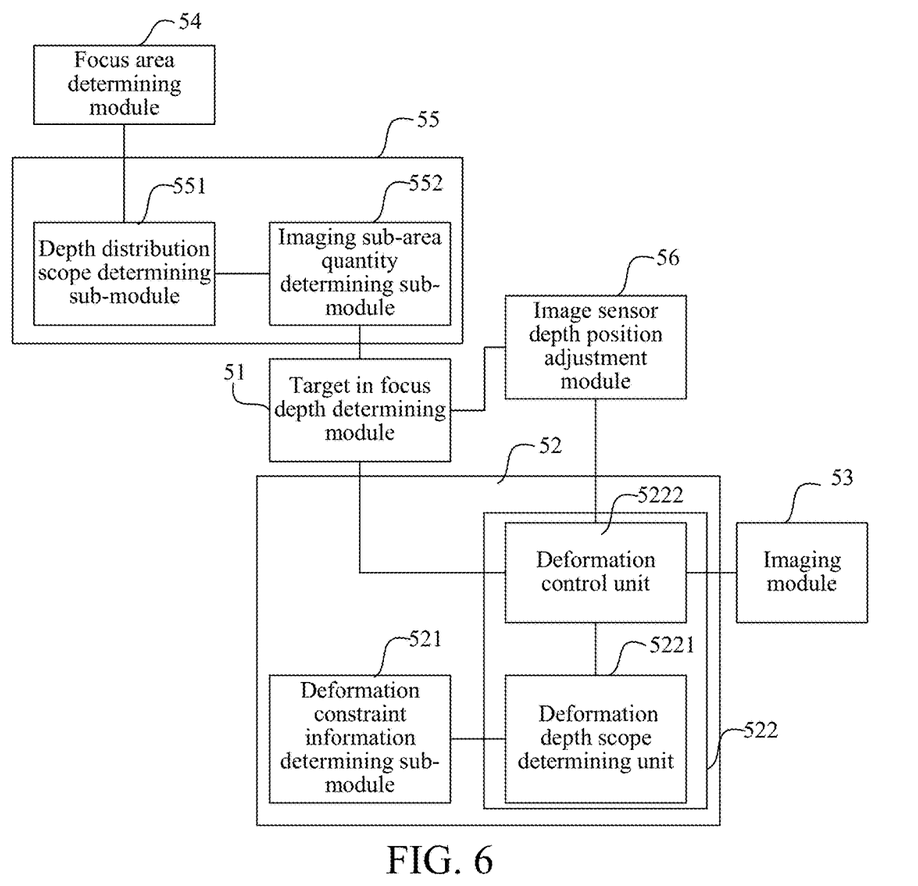
FIG. 6 is a logic block diagram of a second imaging control apparatus provided by an embodiment of the present application.

Optionally, as shown in FIG. 6, the deformation control module 52 includes: a deformation constraint information determining sub-module 521 and a deformation control sub-module 522. The deformation constraint information determining sub-module 521 is configured to determine deformation constraint information of the image sensor; and the deformation control sub-module 522 is configured to control, according to the deformation constraint information and the target in focus depth positions, the deformation of the image sensor. The solution combines the deformation constraint information of the image sensor with the target in focus depth position information, which are commonly used as a basis for the deformation control of the image sensor, so that within the allowable scope of the deformation of the image sensor, the actual focus positions of the at least two imaging sub-areas approach or coincide with the corresponding target in focus depth positions as much as possible, thereby improving practicability of the solution and rationality of the deformation control.

Optionally, the deformation control sub-module 522 includes: a deformation depth scope determining unit 5221 and a deformation control unit 5222. The deformation depth scope determining unit 5221 is configured to determine, according to the deformation constraint information, a maximum deformation depth scope of the at least two imaging sub-areas along the depth direction. The deformation control unit 5222 is configured to control, according to the maximum deformation depth scope and the target in focus depth positions, the deformation of the at least two imaging sub-areas. The solution may allocate the deformation in an aimed manner within the maximum deformation depth scope and/or improve a utilization of the deformation, thereby widening the application scope of the solution.

Optionally, the imaging control apparatus further includes: a focus area determining module 54 and an imaging sub-area determining module 55. The focus area determining module 54 is configured to determine, according to a preview image of the object, the focus area. The imaging sub-area determining module 55 is configured to determine, according the focus area, the at least two imaging sub-areas, where the at least two imaging sub-areas respectively correspond to at least two focus sub-areas included in the focus area. The solution determines, according to the depth distribution scope of the focus area corresponding to the object, the quantity of the imaging sub-areas so as to divide the imaging sub-areas in a more aimed manner.

Optionally, the imaging sub-area determining module 55 includes: a depth distribution scope determining sub-module 551 and an imaging sub-area quantity determining sub-module 552. The depth distribution scope determining sub-module 551 is configured to determine, according to the depth information, the depth distribution scope of the focus area part corresponding to the object. The imaging sub-area quantity determining sub-module 552 is configured to determine, according the depth distribution scope, the quantity of the imaging sub-areas. The solution may divide the imaging sub-areas in a more aimed manner, thereby improving the quality of imaging.

Optionally, the quantity of the imaging sub-areas corresponding to the focus area that corresponds to a larger depth distribution scope is greater than the quantity of the imaging sub-areas corresponding to the focus area that corresponds to a smaller depth distribution scope. The solution can divide the imaging sub-areas in a more aimed manner. Specifically, for the focus area having the broader depth distribution scope, more imaging sub-areas are determined, and the depth of field scopes of the imaging sub-areas after the focusing overlap each other so as to make the depth of filed scope after the overlapping and the depth distribution scope corresponding to the focus area match each other as much as possible, or make the depth of field scope after the overlapping cover more of the depth distribution scope corresponding to the focus area as much as possible. In this way, the probability that the different depth parts corresponding to the focus area can acquire the clear imaging may be increased significantly, thereby improving the quality of imaging. However, for the focus area having a narrower depth distribution scope, fewer imaging sub-areas are determined so as to help reduce complexity of the solution as much as possible as the imaging sub-area is taken as a granularity to implement the fine focus.

Optionally, the imaging control apparatus further includes: an image sensor depth position adjustment module 56. The image sensor depth position adjustment module 56 is configured to adjust the depth position of the image sensor so as to make the depth position of the image sensor after the adjustment locate between the depth position scopes corresponding to the at least two imaging sub-areas. By adjusting the depth position of the image sensor, the solution changes reference starting points for the fine focus of the imaging sub-areas, and helps to make full use of the maximum allowable deformation depth of the image sensor, and/or, balance requirements on deformation degrees of the different imaging sub-areas, thereby improving the quality of imaging.

Figure 7:
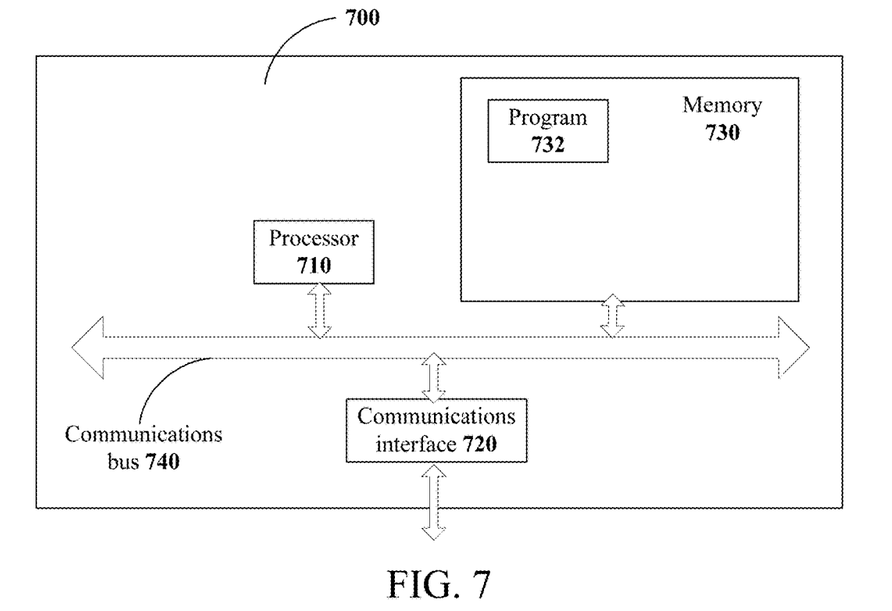
FIG. 7 is a schematic structural diagram of a third imaging control apparatus provided by an embodiment of the present application.

FIG. 7 is a schematic structural diagram of a third imaging control apparatus (or called focusing apparatus) provided by an embodiment of the present application. The specific implementation manner of the imaging control apparatus 700 is not limited in specific embodiments of the present application. As shown in FIG. 7, the focusing apparatus 800 may include:

a processor 710, a communications interface 720, a memory 730, and a communications bus 740; where:

the processor 710, the communications interface 720 and the memory 730 implement mutual communication by the communications bus 740.

The communications interface 720 is configured to communicate with, for example, a deformable image sensor.

The processor 710 is configured to execute a program 732, specifically, to execute relative steps in any one of the foregoing method embodiments.

For example, the program 732 may include program code, where the program code includes computer operation instructions.

The processor 710 may be a Central Processing Unit (CPU), or an Application Specific Integrated Circuit (ASIC), or may be configured as one or more integrated circuits for implementing the embodiments of the present application.

The memory 730 is configured to store the program 732. The memory 730 may include a Random Access Memory (RAM), and may further include a non-volatile memory, for example, at least one magnetic disk storage.

For example, in an optional implementation manner, the processor 710 may implement the following steps by implementing the program 732: determining, at least according to depth information of an object to be photographed, target in focus depth positions respectively corresponding to at least two imaging sub-areas of the image sensor; controlling deformation of the image sensor so as to make depth positions of reference points of the at least two imaging sub-areas after the deformation approach or coincide with the corresponding target in focus depth positions; and acquiring, based on the image sensor after the deformation, an image of the object. In other optional implementation manners, the processor 710 may further implement the steps described in any one of the foregoing embodiments by executing the program 732, which is not described in detail herein.

For specific implementation of the steps in the program 732, reference may be made to the corresponding description in the corresponding steps, modules, sub-modules, and units in the foregoing embodiments, which is not described herein again. Persons skilled in the art may clearly understand that, for a convenient and concise description, the specific working process of the devices and the modules described above may refer to a corresponding process description in the foregoing method embodiments, which is not described herein again.

Figure 8:
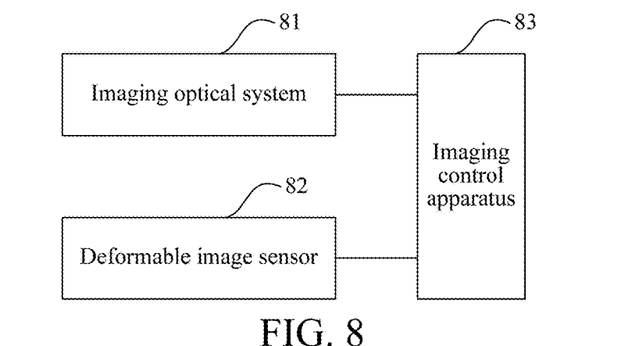
FIG. 8 is a logic block diagram of an imaging device provided by an embodiment of the present application.

FIG. 8 is a logic block diagram of a photographing device provided by an embodiment of the present application. As shown in FIG. 8, the photographing device provided by the embodiment of the present application includes: an imaging optical system 81, a deformable image sensor 82 and any one of the imaging control apparatuses 83 provided by the embodiment of the present application.

A surface shape of the image sensor may be deformable, for example, may be the image sensor having at least a part of the surface shape of the imaging plane that may change, and a specific structure and a form of components of the image sensor are not limited. For example, the image sensor includes a flexible image sensor, as shown in FIG. 1b, and the flexible image sensor may be bent to some extent by an external force. And/or, for example, the image sensor includes the multiple imaging sub-areas in an array distribution, and the at least two imaging sub-areas are mutually linked by a deformable connection component, as shown in FIG. 1c, and the deformable connection component may include but is not limited to a flexible component or a controlled deformable material component, where the controlled deformable material component may include but is not limited to a photo deformable material component, a magnetic deformable material component, a piezoelectric material component, and the like.

The imaging optical system may include but is not limited to at least one imaging lens. The structure, working mechanism, imaging control method, technical effect that can be achieved and mechanism analysis of the imaging control apparatus may all refer to the description in other parts of the present application, which is not described herein again.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation, or replace a feature in another implementation.

It should be emphasized that, terms "comprise/include" used herein refer to existence of a feature, an element, a step, or a component, but do not exclude existence or addition of one or more of other features, elements, steps, or components.

Finally, it should be noted that the foregoing implementation manners are merely used to describe the present application, but are not intended to limit the present application. A person of ordinary skill in the art may further make various variations and modifications without departing from the spirit and scope of the present application. Therefore, all the equivalent technical solutions also fall within the scope of the present application, and the patent protection scope of the present application should be subject to the claims.

What is claimed is:

1. An imaging control method, comprising:
    determining, at least according to depth information of an object, target in focus depth positions respectively corresponding to at least two imaging sub-areas of an image sensor;
    controlling deformation of the image sensor so as to make reference points of the at least two imaging sub-areas after the deformation to approach or coincide with the corresponding target in focus depth positions; and
    acquiring, based on the image sensor after the deformation, an image of the object;
    wherein the controlling deformation of the image sensor comprises:
    determining deformation constraint information of the image sensor; and
    determining, according to the deformation constraint information, a maximum deformation depth scope of the at least two imaging sub-areas along a depth direction; and
    controlling, according to the maximum deformation depth scope and the target in focus depth positions, the deformation of the at least two imaging sub-areas.

2. The method of claim 1, wherein the at least two target in focus depth positions are different.

3. The method of claim 1, further comprising:
    determining, according to a preview image of the object, a focus area; and
    determining, according the focus area, the at least two imaging sub-areas, wherein the at least two imaging sub-areas respectively correspond to at least two focus sub-areas comprised in the focus area.

4. The method of claim 3, wherein the determining, according to the focus area, the at least two imaging sub-areas comprises:
    determining, according to the depth information, a depth distribution scope of the focus area part corresponding to the object; and
    determining, according to the depth distribution scope, a quantity of the imaging sub-areas.

5. The method of claim 4, wherein the quantity of the imaging sub-areas corresponding to the focus area that corresponds to a larger depth distribution scope is greater than the quantity of the imaging sub-areas corresponding to the focus area that corresponds to a smaller depth distribution scope.

6. The method of claim 1, further comprising:
    adjusting a depth position of the image sensor so as to make the depth position of the image sensor after the adjustment locate between depth position scopes corresponding to the at least two imaging sub-areas.

7. The method of claim 1, wherein the reference point of at least one of the imaging sub-areas is a central point of the imaging sub-area.

8. An imaging control apparatus, characterized by comprising a processor and a memory, the memory storing computer executable instructions, the processor being connected to the memory through a communication bus, and when the apparatus for controlling task migration operates, the processor executing the computer executable instructions stored in the memory, causing the apparatus for controlling task migration to execute operations, comprising:
    determining, at least according to depth information of an object, target in focus depth positions respectively corresponding to at least two imaging sub-areas of an image sensor;
    controlling deformation of the image sensor so as to make reference points of the at least two imaging sub-areas after the deformation approach or coincide with the corresponding target in focus depth positions; and
    acquiring, based on the image sensor after the deformation, an image of the object;
    wherein the controlling deformation of the image sensor comprises:
    determining deformation constraint information of the image sensor; and
    determining, according to the deformation constraint information, a maximum deformation depth scope of the at least two imaging sub-areas along a depth direction; and
    controlling, according to the maximum deformation depth scope and the target in focus depth positions, the deformation of the at least two imaging sub-areas.

9. The apparatus of claim 8, wherein the operations further comprise:
    determining, according to a preview image of the object, a focus area; and
    determining, according the focus area, the at least two imaging sub-areas, wherein the at least two imaging sub-areas respectively correspond to at least two focus sub-areas comprised in the focus area.

10. The apparatus of claim 9, wherein the determining, according to the focus area, the at least two imaging sub-areas comprises:
    determining, according to the depth information, a depth distribution scope of the focus area part corresponding to the object; and
    determining, according the depth distribution scope, a quantity of the imaging sub-areas.

11. The apparatus of claim 10, wherein the quantity of the imaging sub-areas corresponding to the focus area that corresponds to a larger depth distribution scope is greater than the quantity of the imaging sub-areas corresponding to the focus area that corresponds to a smaller depth distribution scope.

12. The apparatus of claim 8, wherein the operations further comprise:
    adjusting a depth position of the image sensor, so as to make the depth position of the image sensor after the adjustment locate between depth position scopes corresponding to the at least two imaging sub-areas.

13. The apparatus of claim 8, wherein the reference point of at least one of the imaging sub-areas is a central point of the imaging sub-area.

14. An imaging device, comprising: an imaging optical system, a deformable image sensor, and an imaging control apparatus according to claim 8.

15. The imaging device of claim 14, wherein the image sensor comprises a flexible image sensor.

16. The imaging device of claim 14, wherein the image sensor comprises multiple imaging sub-areas in an array distribution, and the at least two imaging sub-areas are connected by a deformable connection component.

17. A non-transitory computer readable storage apparatus, comprising at least one executable instruction, which, in response to execution by a processor of a photographing device, causes the photographing device to perform an imaging control method, comprising:
    determining, at least according to depth information of an object, target in focus depth positions respectively corresponding to at least two imaging sub-areas of an image sensor;

controlling deformation of the image sensor so as to make reference points of the at least two imaging sub-areas after the deformation to approach or coincide with the corresponding target in focus depth positions; and acquiring, based on the image sensor after the deformation, an image of the object;

wherein the controlling deformation of the image sensor comprises:

determining deformation constraint information of the image sensor; and determining, according to the deformation constraint information, a maximum deformation depth scope of the at least two imaging sub-areas along a depth direction; and controlling, according to the maximum deformation depth scope and the target in focus depth positions, the deformation of the at least two imaging sub-areas.

18. The apparatus of claim 8, wherein the at least two target in focus depth positions are different.

* * * * *